US011381388B2

United States Patent
Hong et al.

(10) Patent No.: US 11,381,388 B2
(45) Date of Patent: Jul. 5, 2022

(54) STORAGE DEVICE SHARING DATA ENCRYPTION KEY AS ENCRYPTED AND OPERATING METHOD OF STORAGE DEVICE

(71) Applicant: SAMSUNG ELECTRONICS CO., LTD., Suwon-si (KR)

(72) Inventors: Hyunsook Hong, Suwon-si (KR); Jintaek Kwon, Suwon-si (KR); Myeongjong Lee, Suwon-si (KR); Seung-Jae Lee, Suwon-si (KR); Seokgi Hong, Suwon-si (KR); Byung-Gook Kim, Suwon-si (KR); Jisoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

(21) Appl. No.: 16/674,413

(22) Filed: Nov. 5, 2019

(65) Prior Publication Data
US 2020/0169395 A1    May 28, 2020

(30) Foreign Application Priority Data

Nov. 27, 2018   (KR) .................. 10-2018-0148502
Apr. 4, 2019    (KR) .................. 10-2019-0039623

(51) Int. Cl.
*H04L 9/08*     (2006.01)
*G06F 12/14*    (2006.01)
*H04L 9/32*     (2006.01)

(52) U.S. Cl.
CPC ........ *H04L 9/0841* (2013.01); *G06F 12/1408* (2013.01); *H04L 9/0825* (2013.01); *H04L 9/0861* (2013.01); *H04L 9/3226* (2013.01)

(58) Field of Classification Search
CPC ... H04L 9/0841; H04L 9/0825; H04L 9/0861; H04L 9/3226; G06F 12/1408
See application file for complete search history.

(56) References Cited

U.S. PATENT DOCUMENTS 8,332,640 B2 * 12/2012 Takano ............ G11B 20/00181
                                                    713/168
8,509,448 B2    8/2013 Thomas et al.
(Continued)

FOREIGN PATENT DOCUMENTS

JP    2006-140743    6/2006
JP    2008-160214    7/2008
(Continued)

OTHER PUBLICATIONS

Carlo Meijer et al., Self-encrypting deception weaknesses in the encryption of solid state drives (SSDs), draft of May 11, 2018.
(Continued)

*Primary Examiner* — Shanto Abedin
(74) *Attorney, Agent, or Firm* — F. Chau & Associates, LLC

(57) ABSTRACT

A storage device includes a nonvolatile memory device, and a controller that manages a data encryption key (DEK). The DEK is used to encrypt data to be written in a storage space of the nonvolatile memory device by a first user and to decrypt data read from the storage space. The controller grants a second user authority to access the storage space by encrypting the DEK based on a Diffie-Hellman (DH) algorithm, grants a second user authority to access the encrypted DEK, and decrypts the encrypted DEK based on the DH algorithm.

15 Claims, 12 Drawing Sheets

(56) References Cited

U.S. PATENT DOCUMENTS

| | | | |
|---|---|---|---|
| 9,026,805 B2 | 5/2015 | Acar et al. | |
| 9,031,233 B2* | 5/2015 | Kang | H04L 9/0866 |
| | | | 380/44 |
| 9,665,501 B1* | 5/2017 | Obukhov | H04L 9/0861 |
| 9,705,854 B2 | 7/2017 | Khazan et al. | |
| 9,910,791 B1* | 3/2018 | Dibb | G06F 3/0683 |
| 2007/0260822 A1* | 11/2007 | Adams | H04M 1/72412 |
| | | | 711/147 |
| 2013/0121488 A1* | 5/2013 | Kang | H04L 9/0894 |
| | | | 380/44 |
| 2014/0032933 A1* | 1/2014 | Smith | G06F 21/31 |
| | | | 713/193 |
| 2017/0085543 A1 | 3/2017 | Choi et al. | |
| 2019/0245682 A1* | 8/2019 | Alwen | H04L 9/16 |
| 2021/0111875 A1* | 4/2021 | Le Saint | H04L 9/085 |

FOREIGN PATENT DOCUMENTS

| | | |
|---|---|---|
| JP | 5529691 | 6/2014 |
| KR | 10-0872817 | 12/2008 |
| KR | 10-1297648 | 8/2013 |

OTHER PUBLICATIONS

CE Stevens, AT Attachment 8-ATAATAPI Command Set—4 (ACS-4), Working Draft American National Standard, Revision 14, 2016.
Trusted Computing Group., TCG storage security subsystem class Opal specification version 2.01, 2015.
zdnet.com, Flaws in self-encrypting SSDs let attackers bypass disk encryption, 2018.

\* cited by examiner

STORAGE DEVICE SHARING DATA ENCRYPTION KEY AS ENCRYPTED AND OPERATING METHOD OF STORAGE DEVICE

CROSS-REFERENCE TO RELATED APPLICATIONS

This application claims priority under 35 U.S.C. § 119 to Korean Patent Application Nos. 10-2018-0148502 filed on Nov. 27, 2018, and 10-2019-0039623 filed on Apr. 4, 2019, in the Korean Intellectual Property Office, the disclosures of which are incorporated by reference herein in their entireties.

TECHNICAL FIELD

Exemplary embodiments of the inventive concept relate to a semiconductor device, and more particularly, to a storage device that supports encrypting and sharing encryption keys of a plurality of users using the storage device, and an operating method of the storage device.

DISCUSSION OF THE RELATED ART

A storage device may store data under control of a host device such as, for example, a computer, a smartphone, a tablet computer, etc. The storage device may store data on a magnetic disk, such as a hard disk drive (HDD), or a semiconductor memory, in particular, a nonvolatile memory, such as a solid state drive (SSD) or a memory card.

A nonvolatile memory device includes, for example, a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM), etc.

To improve security, data to be stored in the storage device may be encrypted using a data encryption key. In certain configurations, the data encryption key is shared between different users. For example, different users may be authorized to access different parts of the storage device using the shared data encryption key. In this case, if the shared data encryption key is not protected, security of the storage device may be compromised.

SUMMARY

Exemplary embodiments of the inventive concept provide a storage device that shares an encryption key between users while maintaining security, and an operating method of the storage device.

According to an exemplary embodiment, a storage device includes a nonvolatile memory device, and a controller that manages a data encryption key (DEK). The DEK is used to encrypt data to be written in a storage space of the nonvolatile memory device by a first user and to decrypt data read from the storage space. The controller grants a second user authority to access the storage space by encrypting the DEK based on a Diffie-Hellman (DH) algorithm, grants the second user authority to access the encrypted DEK, and decrypts the encrypted DEK based on the DH algorithm.

According to an exemplary embodiment, a storage device includes a nonvolatile memory device, and a controller that manages a data encryption key (DEK). The DEK is used to encrypt data to be written in a storage space of the nonvolatile memory device by a first user and to decrypt data read from the storage space. The controller encrypts the DEK in a first manner when the DEK is stored in an area of the nonvolatile memory device associated with the first user, and encrypts the DEK in a second manner, different from the first manner, when the DEK is stored in an area of the nonvolatile memory device associated with a second user.

According to an exemplary embodiment, an operating method of a storage device including a plurality of ranges configured to store data, and a plurality of slots respectively corresponding to the ranges, includes, when a first user accesses the storage device, encrypting a plurality of data encryption keys (DEKs) respectively corresponding to the ranges in a first manner, and storing the DEKs encrypted in the first manner in a first slot of the plurality of slots. The method further includes, when a second user accesses the storage device, allocating a second slot of the plurality of slots to the second user. The method further includes encrypting a DEK corresponding to one range of the plurality of ranges in a second manner, different from the first manner, and storing the DEK encrypted in the second manner in the second slot.

BRIEF DESCRIPTION OF THE DRAWINGS

The above and other objects and features of the inventive concept will become apparent by describing in detail exemplary embodiments thereof with reference to the accompanying drawings, in which.

DETAILED DESCRIPTION

Figure 1:
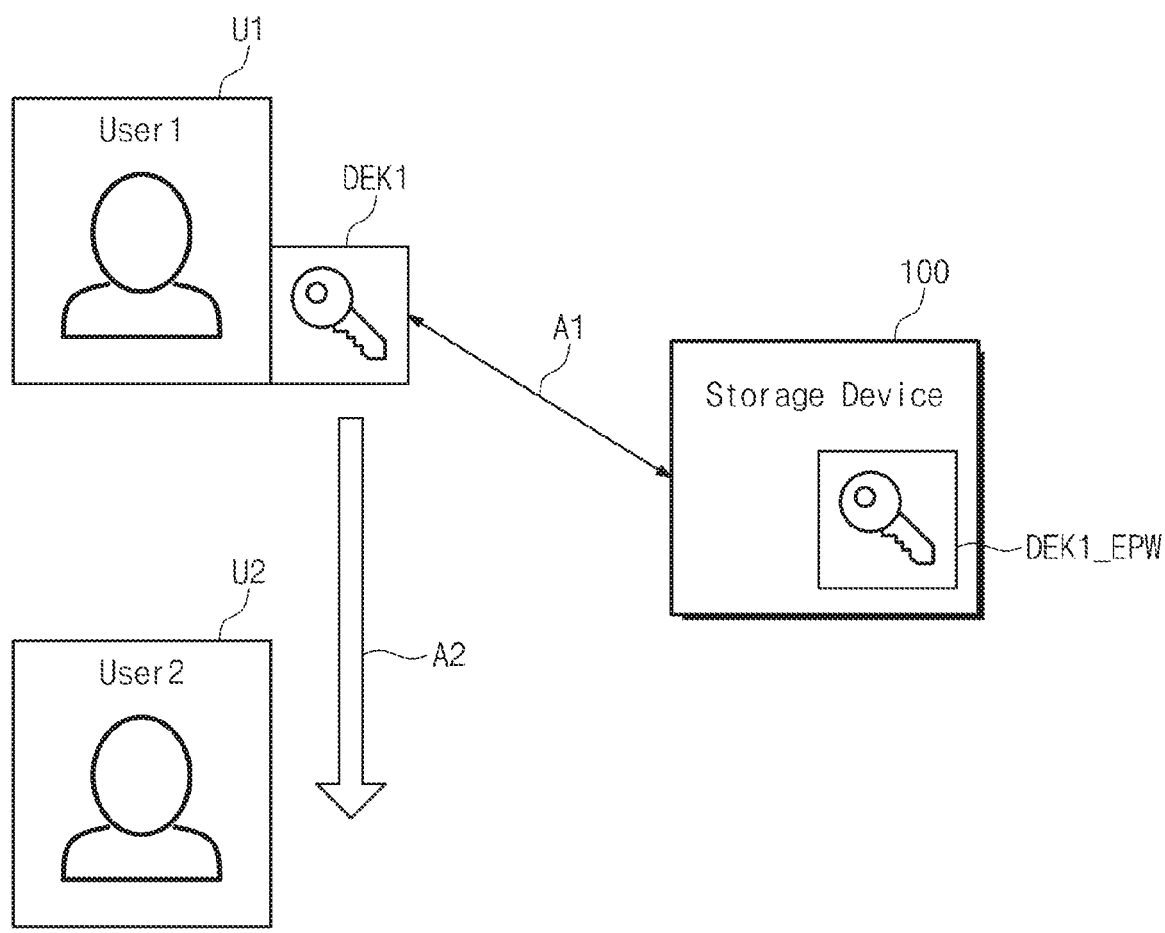
FIG. 1 illustrates an example in which a plurality of users access a storage device.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

FIG. 1 illustrates an example in which a plurality of users access a storage device 100.

Referring to FIG. 1, initially, an internal storage space (or a portion of the internal storage space) of the storage device 100 may be in a lock state. For example, the internal storage space (or a portion of the internal storage space) may be in a lock state when the storage device 100 is first powered on (e.g., when a host of the storage device 100 is first booted up). The storage device 100 in the lock state permits access to a user that has the authority to access the internal storage space, and does not permit access to a user that does not have the authority to access the internal storage space.

For example, a first user U1 may have the authority to access the storage device 100. The first user U1 may perform authentication on the storage device 100, for example, with his/her own authority (or credentials (e.g., password)). When the first user U1 having the authority to access the internal storage space of the storage device 100 performs authentication on the storage device 100, the internal storage space of the storage device 100 in the lock state may be unlocked according to the authority with which the first user U1 accesses the storage device 100. For example, a partial storage space, which is permitted to the first user U1, of the internal storage space of the storage device 100 may be unlocked. For example, the internal storage space of the storage device 100 may be divided into ranges, and the user U1 may have the authority to access a certain range (e.g., the partial storage space) but not to access a different range.

When the partial storage space permitted to the first user U1 is unlocked, the storage device 100 may permit the first user U1 to use a data encryption key of the partial storage space, for example, a first data encryption key DEK1. The first user U1 may write or read data in or from the partial storage space of the storage device 100 using the first data encryption key DEK1.

For example, the first data encryption key DEK1 of the first user U1 may be encrypted with a password that the first user U1 provides, and a first data encryption key DEK1_EPW encrypted with the password may be kept in the storage device 100. When the storage device 100 is in a lock state, the storage device 100 may prohibit access of a user to the first data encryption key DEK1.

When the first user U1 intends to unlock the storage device 100 according to his/her own authority, the first user U1 may input a password to the storage device 100. When the authentication of the input password succeeds, the storage device 100 may decrypt the first data encryption key DEK1_EPW encrypted with the password by using the input password. As marked by a first arrow A1, the first user U1 may access the storage device 100 through the first data encryption key DEK1 that has been decrypted.

For example, when the first user U1 writes data in the storage device 100, the data may be encrypted by using the first data encryption key DEK1, and the data encrypted with the first data encryption key DEK1 may be written in the storage device 100. When the first user U1 reads data from the storage device 100, the data may be decrypted by using the first data encryption key DEK1, and the data decrypted with the first data encryption key DEK1 may be provided to the first user U1.

A second user U2 may have the authority to access the storage device 100. When a storage space of the storage device 100 that the second user U2 intends to access overlaps a storage space of the storage device 100 that the first user U1 intends to access, as marked by a second arrow A2, the second user U2 may have to obtain the first data encryption key DEK1 that is the same as the first data encryption key DEK1 that the first user U1 uses.

When the first data encryption key DEK1 is transferred to the second user U2 in an unencrypted state, the first data encryption key DEK1 may be leaked out during the transmission, resulting in a security issue of the storage device 100. When the first data encryption key DEK1_EPW encrypted with the password of the first user U1 is provided to the second user U2, the first data encryption key DEK1 may be prevented from being leaked out.

However, in this case, the second user U2 would have to know the password of the first user U1 to allow the second user U2 to decrypt the first data encryption key DEK1_EPW encrypted with the password of the first user U1. This means that secret information of the first user U1 is opened to the second user U2, and as a result, it is meaningless to give different authorities (e.g., different access permissions and credentials) to the first user U1 and the second user U2.

In an exemplary embodiment, a specific user performing authentication on the storage device 100 does not mean that the storage device 100 is unlocked. For example, a user to which authority to access a storage space of the storage device 100 is not permitted may be present in a user list of enrolled users. Even though the user that is enrolled but is not authorized performs authentication on the storage device 100, the internal storage space of the storage device 100 may maintain a lock state. To describe a technical feature of the inventive concept, an example of users that are permitted to access the internal storage space of the storage device 100 will be described below.

Figure 2:
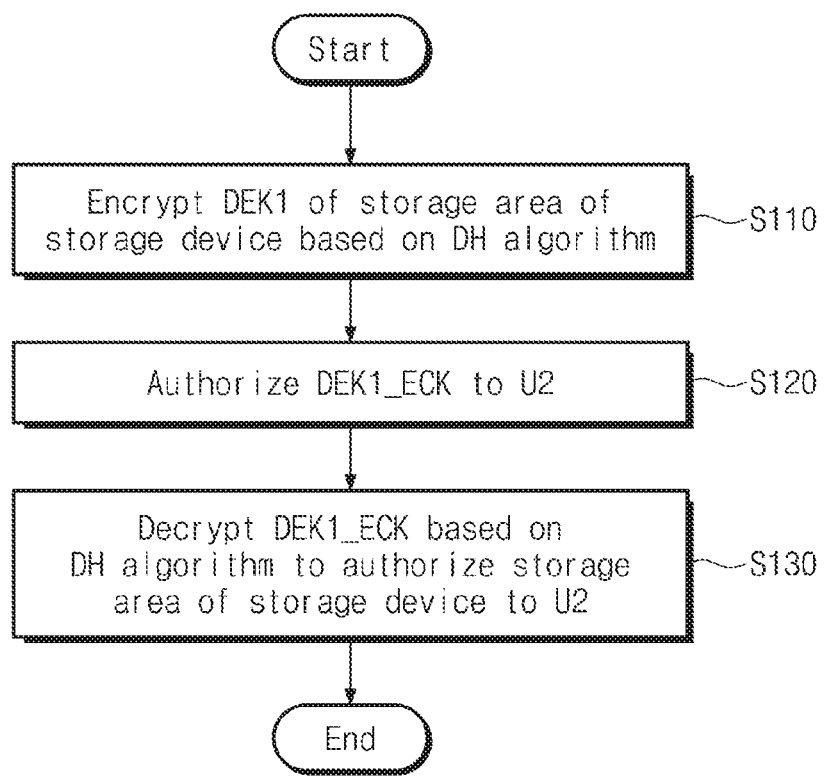
FIG. 2 is a flowchart illustrating an example in which a storage device provides a second user with a first data encryption key in an encrypted state, according to an exemplary embodiment of the inventive concept.

FIG. 2 is a flowchart illustrating an example in which the storage device 100 provides the second user U2 with the first data encryption key DEK1 in an encrypted state, according to an exemplary embodiment of the inventive concept.

Referring to FIGS. 1 and 2, in operation S110, the storage device 100 may encrypt the first data encryption key DEK1 for a storage space of the storage device 100 based on a Diffie-Hellman (DH) algorithm (or a DH key exchange algorithm). For example, the storage device 100 may generate a common key based on the DH key exchange algorithm and may encrypt the first data encryption key DEK1 by using the common key.

For example, the encryption of the first data encryption key DEK1 based on the DH algorithm may be performed in a state in which the first user U1 possessing the first data encryption key DEK1 performs authentication on the storage device 100 according to his/her own authority (e.g., with his/her own credentials (e.g., password)) and unlocks the storage device 100.

In operation S120, the storage device 100 may authorize the second user U2 to access a first data encryption key DEK1_ECK encrypted based on the DH algorithm. For example, granting authority to use the first data encryption key DEK1_EK encrypted with the DH algorithm to the second user U2 may be performed in a state in which the first user U1 unlocks the storage device 100 according to his/her own authority (e.g., with his/her own credentials (e.g., password)).

In operation S130, the storage device 100 may decrypt, based on the DH algorithm, the first data encryption key DEK1_ECK encrypted based on the DH algorithm, and may authorize the second user U2 to access the storage space of the storage device 100. For example, the decryption may be performed in a state in which the second user U2 connects to the storage device 100 and may be a portion of a process in which the second user U2 obtains authority.

The DH algorithm allows for the sharing of a common secret key (e.g., a common key (e.g., CK12)), which is not leaked out to the outside, between the first user U1 and the second user U2. Based on the DH algorithm, the storage device 100 may perform encryption and decryption on the first data encryption key DEK1 by using the common key CK12.

When the first data encryption key DEK1 is shared by the first user U1 and the second user U2 in an encrypted state, the first data encryption key DEK1 may be prevented from being leaked out in a sharing process. Also, because each of the first user U1 and the second user U2 performs encryption and decryption by using the common key CK12, secret information of the first user U1 may be prevented from being opened to the second user U2.

Figure 3:
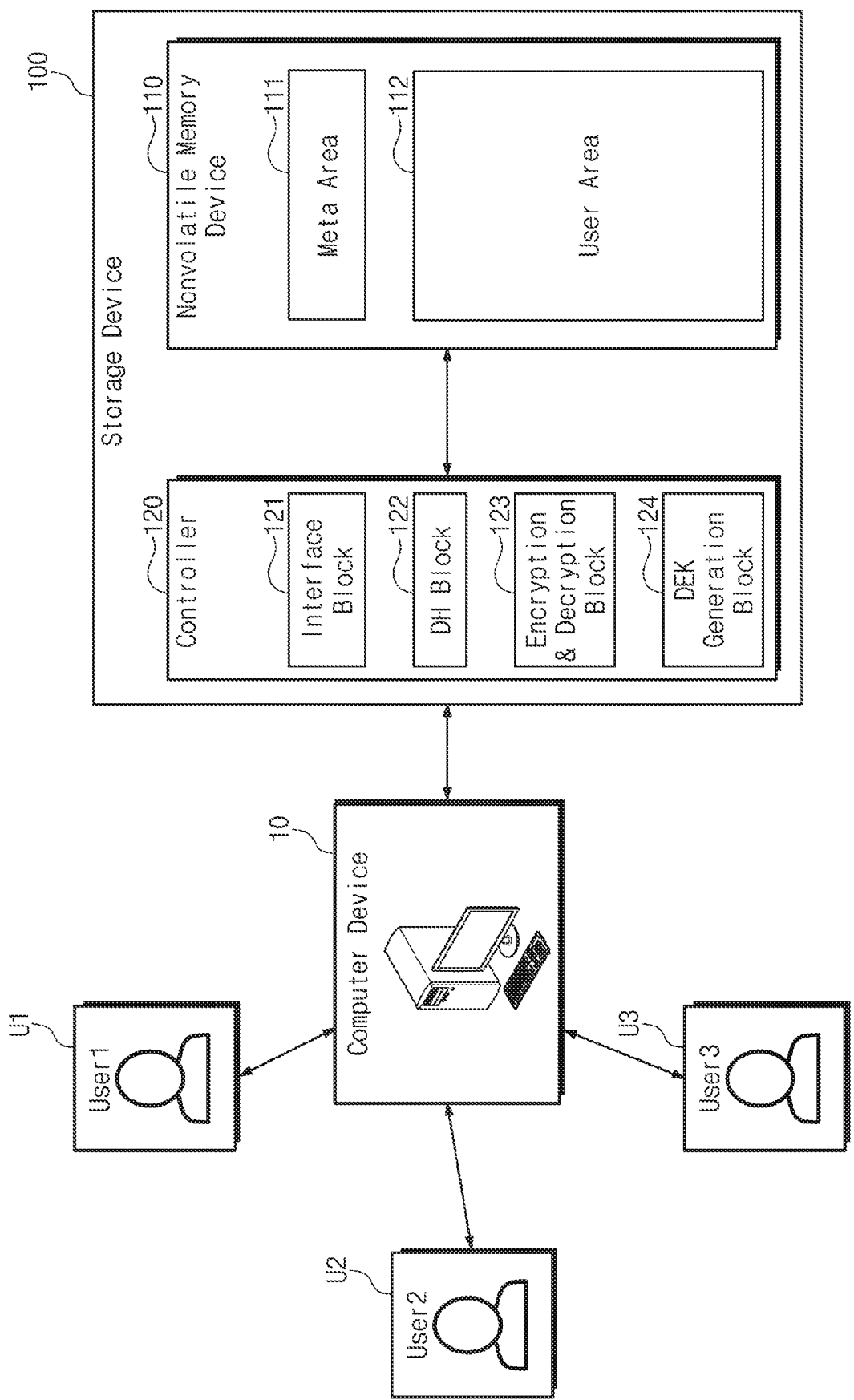
FIG. 3 illustrates an example in which a plurality of users access a storage device, according to an exemplary embodiment of the inventive concept.

FIG. 3 illustrates an example in which a plurality of users access the storage device 100, according to an exemplary embodiment of the inventive concept.

Referring to FIG. 3, the storage device 100 may be coupled to a computer device 10. The computer device 10 may include, but is not limited to, various devices which are capable of accessing the storage device 100 such as, for example, a computer, a notebook, a smartphone, a smart pad, a server, and a workstation.

The first user U1, the second user U2, and a third user U3 may access the storage device 100 through the computer device 10. The first user U1, the second user U2, and the third user U3 may have their own authorities for the storage device 100. For example, the first user U1, the second user U2, and the third user U3 may unlock the storage device 100 through their own passwords to access the storage device 100 at their corresponding levels of authority.

The storage device 100 includes a nonvolatile memory device 110 and a controller 120. The nonvolatile memory device 110 may include various memories such as, for example, a flash memory, a phase-change random access memory (PRAM), a magnetic RAM (MRAM), a resistive RAM (RRAM), a ferroelectric RAM (FRAM), etc. A storage space of the nonvolatile memory device 110 may be divided into a meta area 111 and a user area 112.

The meta area 111 may be used to store metadata for managing the storage device 100. For example, the meta area 111 may store mapping information between physical addresses of the nonvolatile memory device 110 and logical addresses that the computer device 10 allocates to the storage device 100. Also, the meta area 111 may store information about authorities of the first user U1, the second user U2, and the third user U3. In an exemplary embodiment, the authorities of the first user U1, the second user U2, and the third user U3 may be different. For example, the different authority levels of the first user U1, the second user U2, and the third user U3 may grant the users different levels of access to the storage device 100.

The user area 112 may be used to store data (e.g., encrypted data) that are write requested by the computer device 10. A storage space of the meta area 111 may not be identified by the computer device 10 as the storage space of the storage device 100. The computer device 10 may identify only the storage space of the user area 112 as the storage space of the storage device 100.

The controller 120 may control a read operation, a write operation, and an erase operation for the nonvolatile memory device 110. The controller 120 may manage the information about the authorities of the first user U1, the second user U2, and the third user U3, and may control access of the first user U1, the second user U2, and the third user U3 to the user area 112.

The controller 120 may include an interface block 121, a Diffie-Hellman (DH) block 122, an encryption and decryption block 123, and a data encryption key (DEK) generation block 124. The interface block 121 may allow the controller 120 to communicate with any other devices. For example, the interface block 121 may include communication components which are based on peripheral component interconnect express (PCIe) and nonvolatile memory express (NVMe), for the purpose of communicating with the computer device 10.

Also, the interface block 121 may include communication components for communicating with the nonvolatile memory device 110. For convenience of description, the communication components for the computer device 10 and the communication components for the nonvolatile memory device 110 will be described as one interface block 121. However, it is to be understood that the components may be divided into two or more blocks.

The DH block 122 may be configured to perform operations based on the DH algorithm. The encryption and decryption block 123 may be configured to perform encryption and decryption. For example, the encryption and decryption block 123 may perform encryption and decryption based on at least one of symmetric-key encryption algorithm such as, for example, AES (Advanced Encryption Standard) and DES (Data Encryption Standard), and asymmetric-key algorithms such as, for example, RSA (Rivest, Sharmir, Adleman) and ECC (Elliptic Curve Cryptography).

The data encryption key generation block 124 may generate data encryption keys. For example, the data encryption key generation block 124 may generate data encryption keys based on at least one of various encryption algorithms including, for example, the above-described encryption algorithms. For example, the data encryption key generation block 124 and the encryption and decryption block 123 may be integrated in one block.

The controller 120 may divide the user area 112 into two or more ranges. The controller 120 may allocate different data encryption keys to the ranges of the user area 112. The controller 120 may give different authorities to access the ranges to the first user U1, the second user U2, and the third user U3.

The controller 120 may permit the first user U1, the second user U2, and the third user U3 to access an authorized range, and may prohibit the first user U1, the second user U2, and the third user U3 from accessing an unauthorized range. One of the first user U1, the second user U2, and the third user U3 may be an administrator. The administrator may have the authority to access all of the ranges of the user area 112.

Also, the administrator may designate (or change) a range(s) that is authorized (or permitted) with regard to any other user. The authority of the administrator may have data encryption keys for all of the ranges. When the storage device 100 is in an unlock state, the controller 120 may encrypt, based on the DH algorithm, a data encryption key, which corresponds to a range to be authorized with regard to any other user, from among data encryption keys associated with released authorities, and may provide the encrypted data encryption key to the other user associated with the range to be authorized. The authority of the other user may be changed by providing the data encryption key encrypted based on the DH algorithm.

When the other user unlocks the storage device 100, that is, with the authority of the other user, the controller 120 may decrypt the data encryption key, which is encrypted based on the DH algorithm (e.g., which is encrypted by using the common key generated based on the DH algorithm). For example, the data encryption key may be decrypted by using a common key generated again based on the DH algorithm. The other user may access the authorized range by using the data encryption key decrypted based on the DH algorithm.

Figure 4:
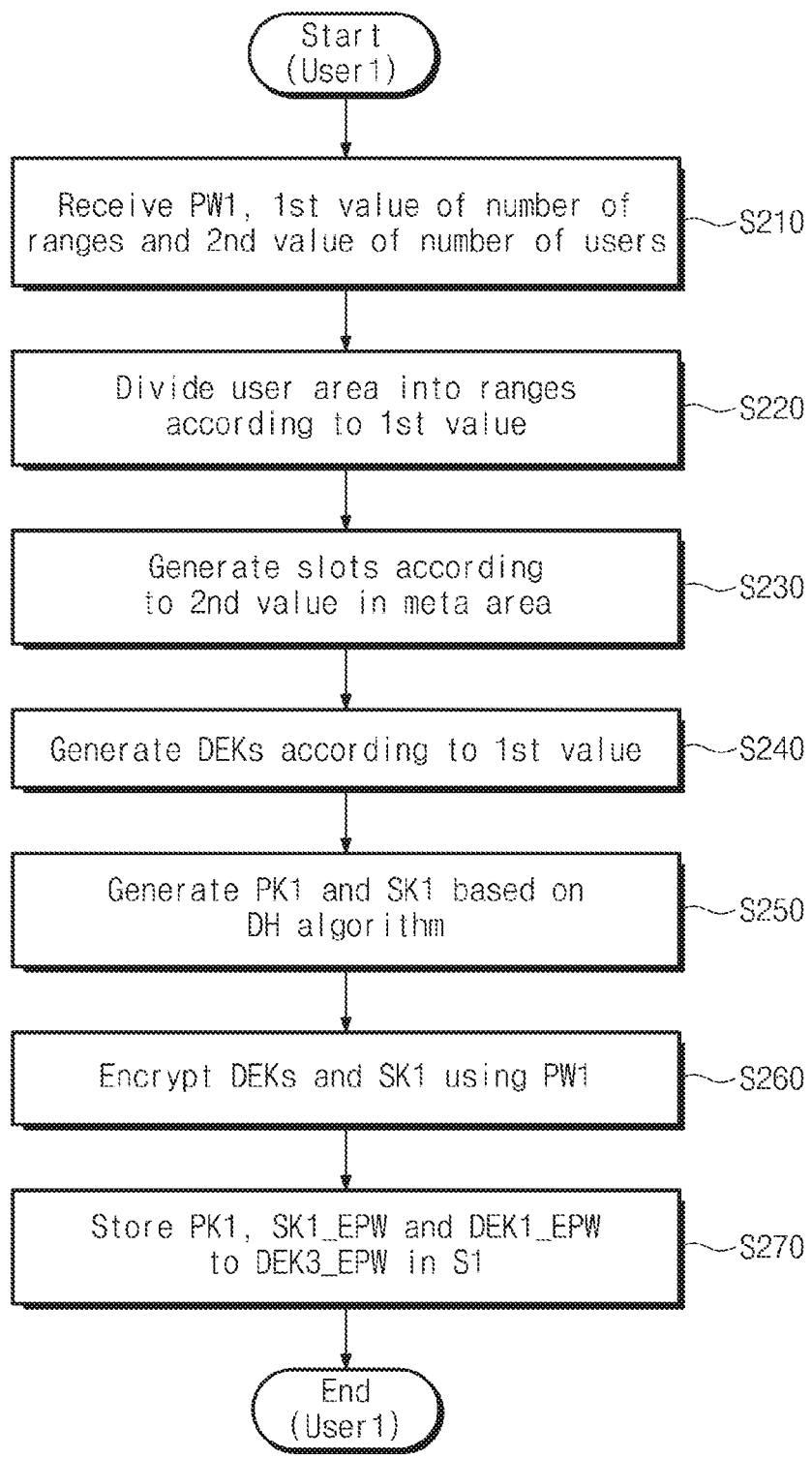
FIG. 4 illustrates a process in which a first user is enrolled as an administrator of a storage device.
Figure 5:
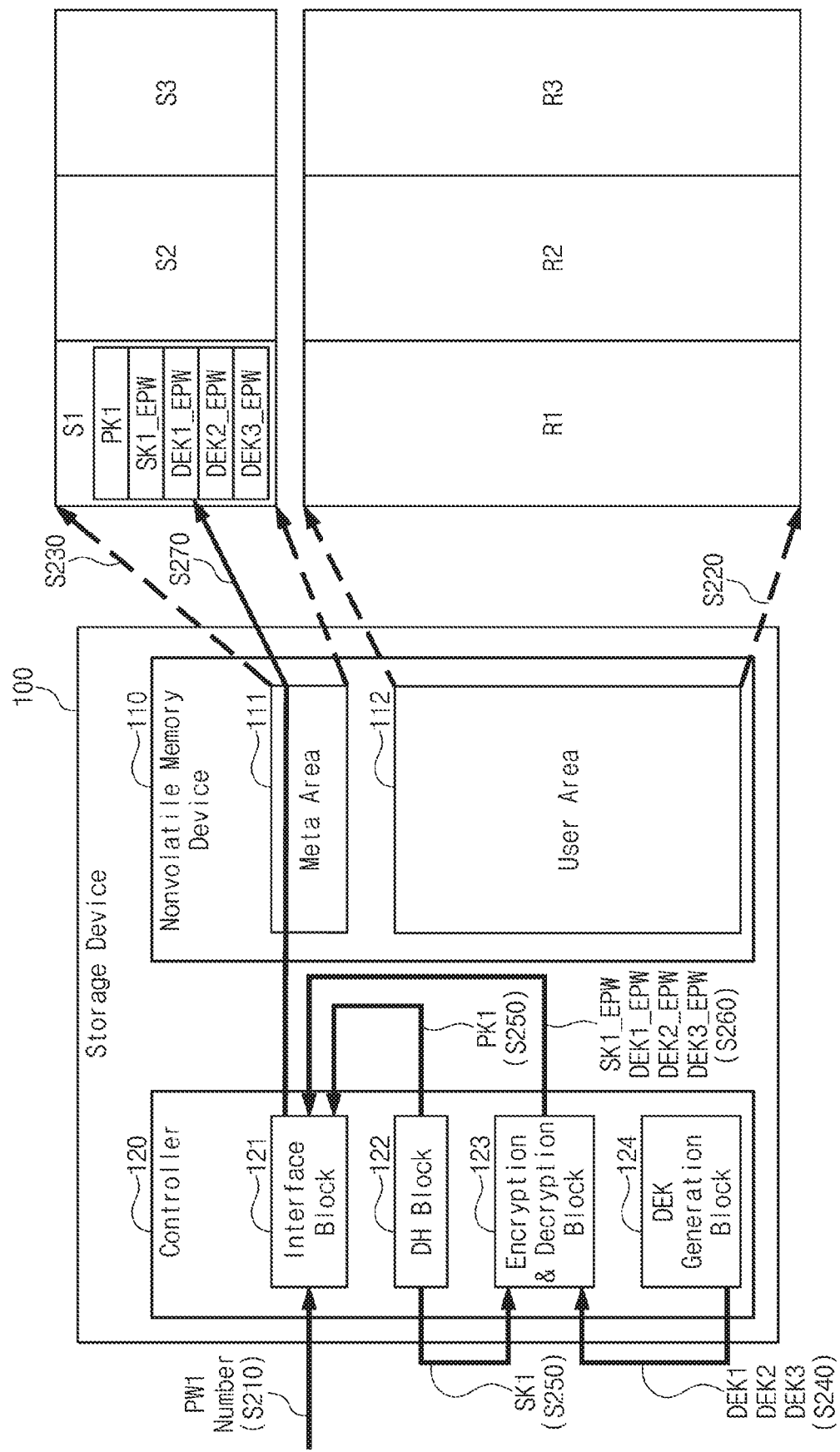
FIG. 5 illustrates an example in which information is generated and exchanged in a storage device in a process of FIG. 4.

FIG. 4 illustrates a process in which the first user U1 is enrolled as an administrator of the storage device 100. FIG. 5 illustrates an example in which information is generated and exchanged in the storage device 100 in the process of FIG. 4. The procedures of FIGS. 4 and 5 may be performed, for example, when the storage device 100 is mounted on the computer device 10, or when the storage device 100 mounted on the computer device 10 is set to an encrypted storage device.

Referring to FIGS. 3, 4, and 5, in operation S210, the interface block 121 of the controller 120 may receive a first password PW1 of the first user U1, a first value indicating the number of ranges of the user area 112, and a second value indicating the number of users.

The first password PW1 may be input from the first user U1 or may be generated by the computer device 10 as unique information indicating the first user U1. The first value and the second value may also include unique information that is input from the first user U1 or is automatically generated by the computer device 10.

According to exemplary embodiments, the first value and the second value may be the same as each other or different from each other. In the example described herein, the first value indicating the number of ranges is 3 and the second value indicating the number of users is 3. In operation S220, the controller 120 may divide the user area 112 into first to third ranges R1 to R3 based on the first value.

In operation S230, the controller 120 may generate first to third slots S1 to S3 in the meta area 111 based on the second value. The first to third slots S1 to S3 may be allocated to the first to third users U1 to U3, respectively. Each of the first to third slots S1 to S3 may be used to store a key associated with the corresponding user.

In operation S240, the data encryption key generation block 124 may generate data encryption keys based on the first value indicating the number of ranges. For example, the data encryption key generation block 124 may generate first to third data encryption keys DEK1 to DEK3 respectively corresponding to the first to third ranges R1 to R3.

In operation S250, the DH block 122 may generate a first public key PK1 and a first secret key SK1. The first public key PK1 and the first secret key SK1 may be generated based on the DH algorithm. The first public key PK1 may be provided to the interface block 121. The first secret key SK1 may be provided to the encryption and decryption block 123.

In operation S260, the encryption and decryption block 123 may encrypt the first secret key SK1 and the first to third data encryption keys DEK1 to DEK3 by using the first password PW1. A first secret key SK1_EPW encrypted with the first password PW1 and first to third data encryption keys DEK1_EPW to DEK3_EPW encrypted with the first password PW1 may be provided to the interface block 121.

In operation S270, the interface block 121 may store the first public key PK1, the first secret key SK1_EPW encrypted with the first password PW1, and the first to third data encryption keys DEK1_EPW to DEK3_EPW encrypted with the first password PW1 in the first slot S1 of the meta area 111 allocated to the first user U1.

When the first user U1 maintains an unlock state of the storage device 100, the controller 120 may respectively access the first to third ranges R1 to R3 by using the first to third data encryption keys DEK1_EPW to DEK3_EPW.

For example, the controller 120 may manage the first to third data encryption keys DEK1_EPW to DEK3_EPW within the encryption and decryption block 123. The encryption and decryption block 123 may be used to encrypt data to be written in the nonvolatile memory device 110 and may be used to decrypt data read from the nonvolatile memory device 110.

The encryption and decryption block 123 does not leak the first to third data encryption keys DEK1_EPW to DEK3_EPW. For example, when the storage device 100 is locked as the first user U1 terminates his/her own authority for accessing the storage device 100, the encryption and decryption block 123 may discard the first to third data encryption keys DEK1 to DEK3. Since the first to third data encryption keys DEK1_EPW to DEK3_EPW encrypted with the first password PW1 are kept in the first slot S1, the authority of the first user U1 may be held.

Subsequently, when the first user U1 again unlocks the storage device 100 according to his/her own authority (e.g., with his/her own credentials (e.g., password)), the controller 120 may obtain a necessary data encryption key by reading a data encryption key necessary from among the first to third data encryption keys DEK1_EPW to DEK3_EPW encrypted with the first password PW1 from the first slot S1 and decrypting the read data encryption key.

The authority of the first user U1 may be terminated in response to, for example, a power interruption of the storage device 100, a message requesting that authority be ended being provided to the storage device 100, or the storage device 100 being left in an idle state for a specific amount of time.

As described with reference to FIGS. 4 and 5, the only data exchanged in an unencrypted state, from among data exchanged between the controller 120 and the nonvolatile memory device 110, are the first public key PK1. Both the first secret key SK1 and the first to third data encryption keys DEK1 to DEK3 are exchanged in an encrypted state, and thus, the security of the storage device 100 is improved.

Figure 6:
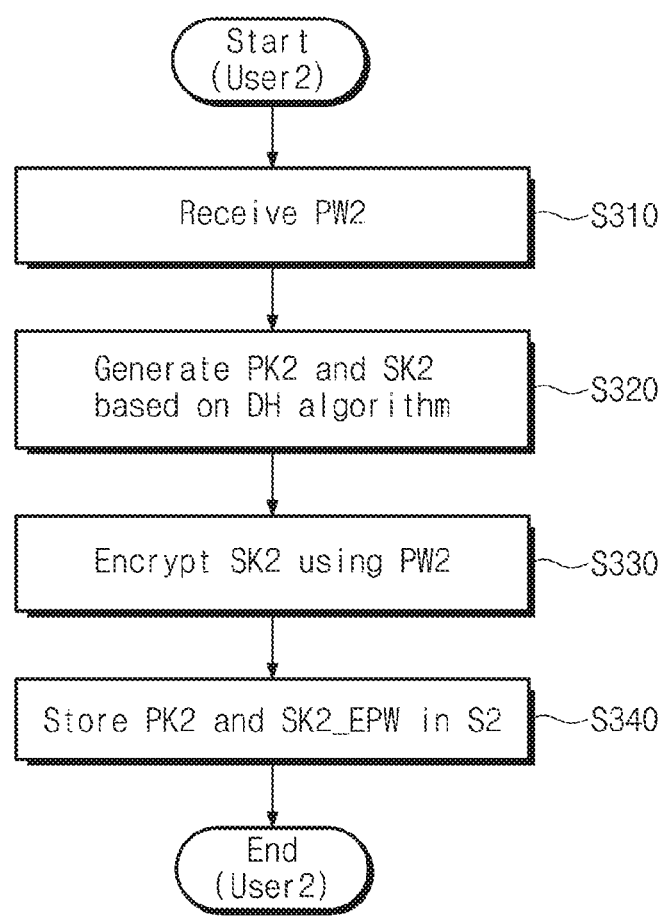
FIG. 6 illustrates a process in which authority to access a storage space of a storage device is requested by a second user.
Figure 7:
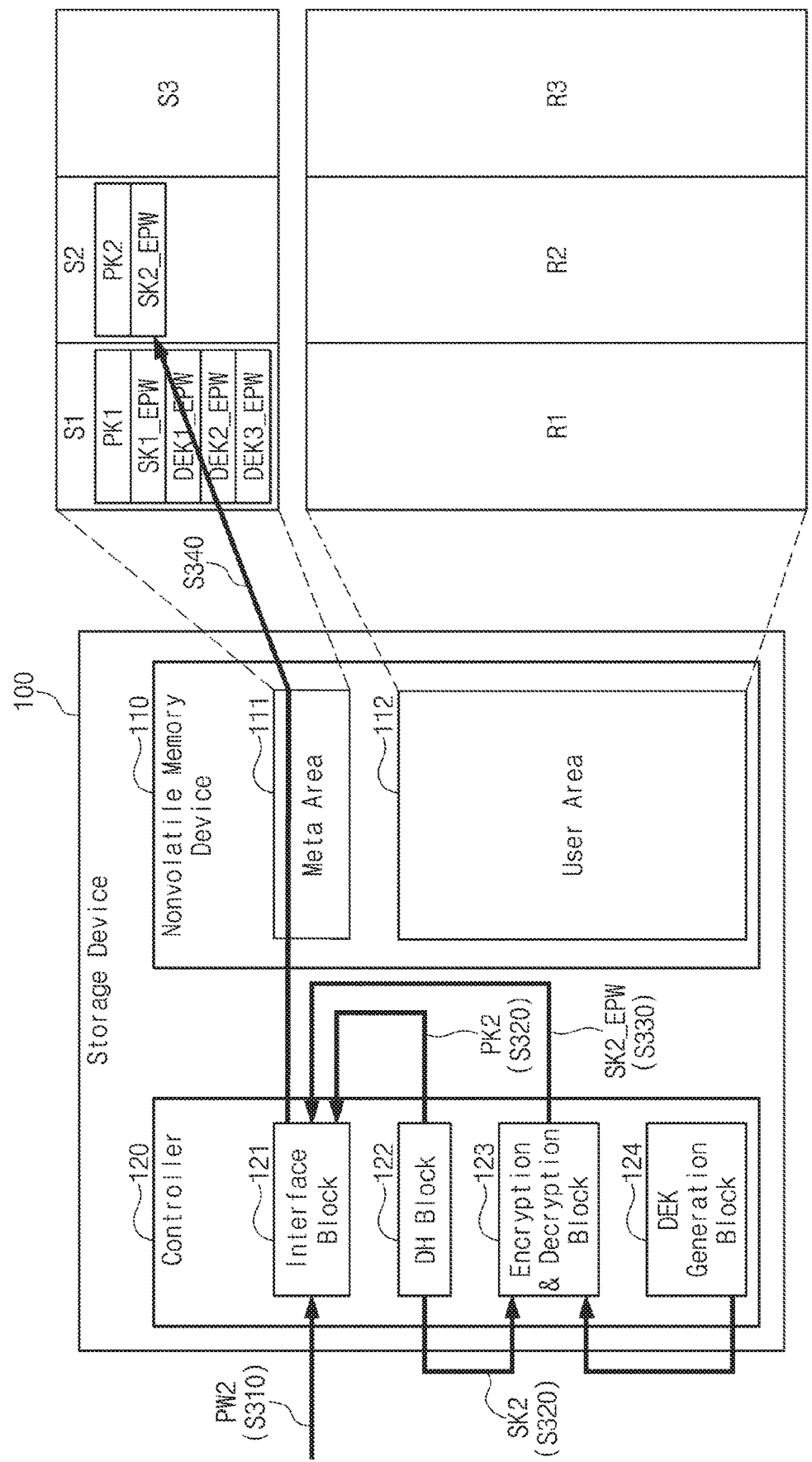
FIG. 7 illustrates an example in which information is generated and exchanged in a storage device in a process of FIG. 6.

FIG. 6 illustrates a process in which authority to access a storage space of the storage device 100 is requested by a second user. FIG. 7 illustrates an example in which information is generated and exchanged in the storage device 100 in the process of FIG. 6. The procedures of FIGS. 6 and 7 may be performed, for example, when the storage device 100 is in a lock state or is unlocked by any other user.

Referring to FIGS. 3, 6, and 7, in operation S310, the interface block 121 of the controller 120 may receive a second password PW2 of the second user U2. The second password PW2 may be input from the second user U2 or may be generated by the computer device 10 as unique information indicating the second user U2.

In operation S320, the DH block 122 may generate a second public key PK2 and a second secret key SK2. The second public key PK2 and the second secret key SK2 may be generated based on the DH algorithm. The second public key PK2 may be provided to the interface block 121. The second secret key SK2 may be provided to the encryption and decryption block 123.

In operation S330, the encryption and decryption block 123 may encrypt the second secret key SK2 by using the second password PW2. A second secret key SK2_EPW encrypted with the second password PW2 may be provided to the interface block 121.

In operation S340, the interface block 121 may store the second public key PK2 and the second secret key SK2_EPW encrypted with the second password PW2 in the second slot S2 of the meta area 111 allocated to the second user U2. Storing the second public key PK2 and the second secret key SK2_EPW encrypted with the second password PW2 in the second slot S2 may occur when the second user U2 requests that the first user U1, who is an administrator, grant authority to a range.

As described with reference to FIGS. 6 and 7, the second public key PK2 is the only data exchanged in an unencrypted state from among data exchanged between the controller 120 and the nonvolatile memory device 110. The second secret key SK2 is exchanged in an encrypted state, and thus, the security of the storage device 100 is improved.

Figure 8:
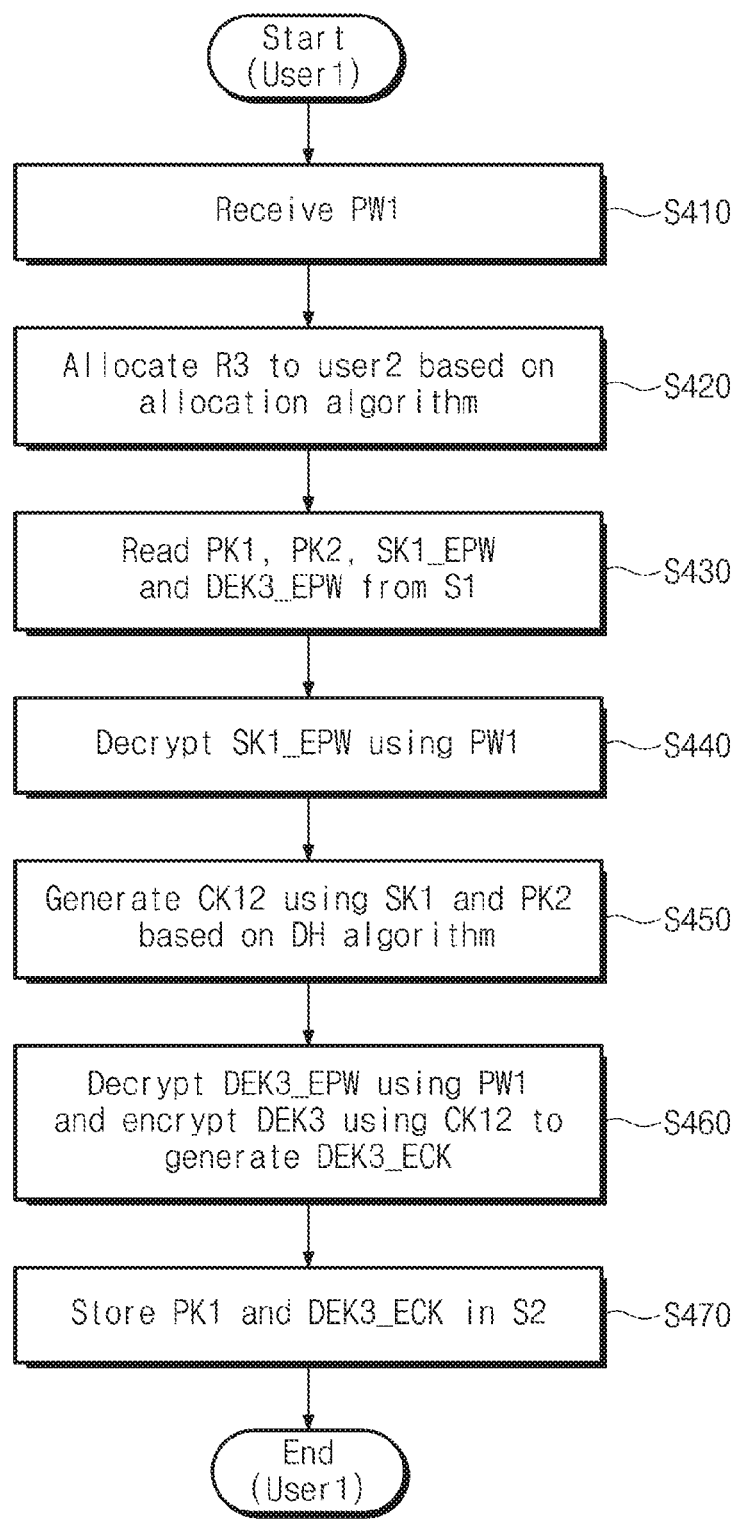
FIG. 8 illustrates a process in which a first user shares a data encryption key with a second user in an encrypted state.
Figure 9:
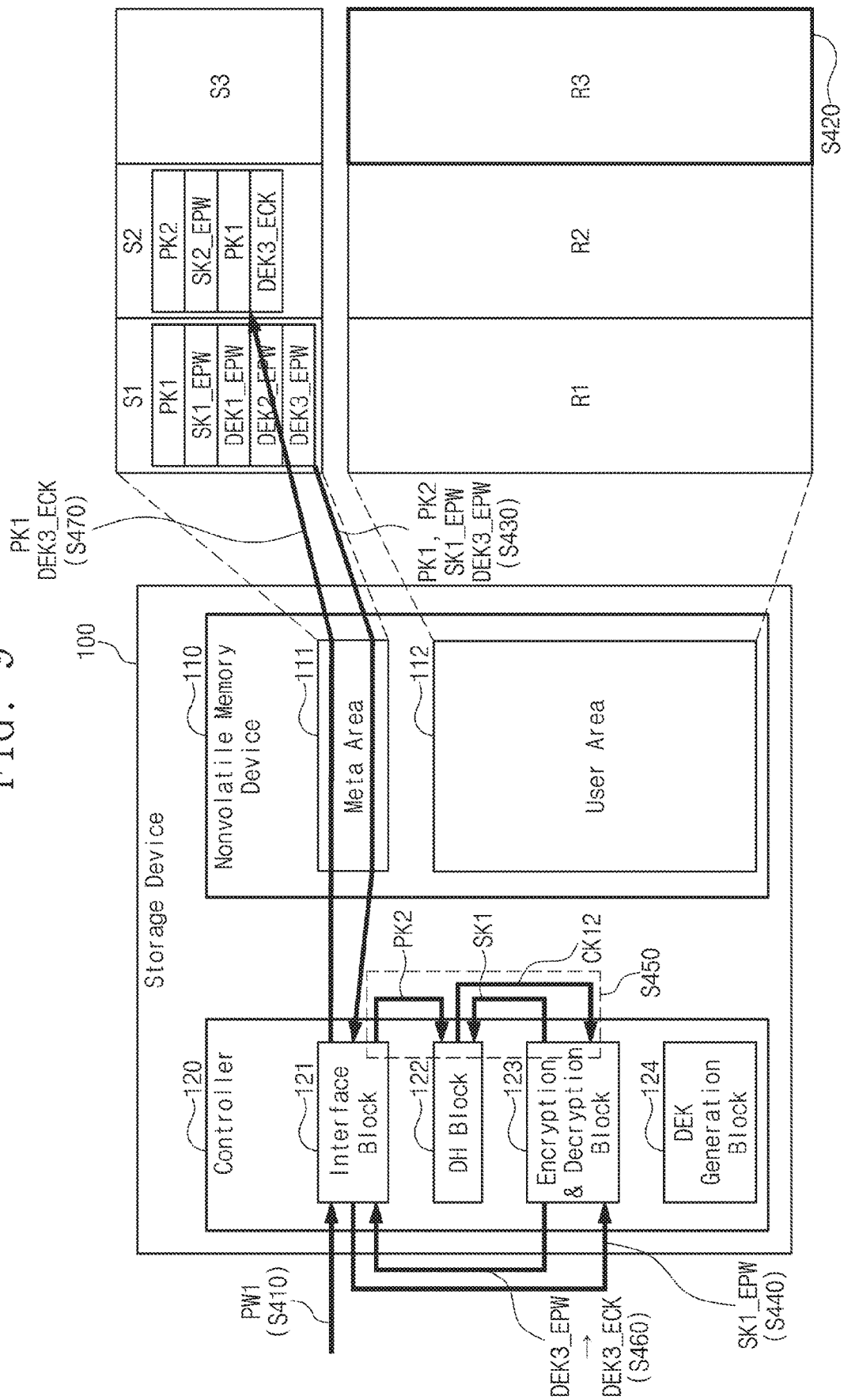
FIG. 9 illustrates an example in which information is generated and exchanged in a storage device in a process of FIG. 8.

FIG. 8 illustrates a process in which the first user U1 shares a data encryption key with the second user U2 in an encrypted state. FIG. 9 illustrates an example in which information is generated and exchanged in the storage device 100 in the process of FIG. 8. The procedures of FIGS. 8 and 9 may be performed in a state in which the first user U1 unlocks the storage device 100.

Referring to FIGS. 3, 8, and 9, in operation S410, the interface block 121 of the controller 120 may receive the first password PW1 of the first user U1.

Since the second public key PK2 and the second secret key SK2_EPW encrypted with the second password PW2 are present in the second slot S2, it is indicated to the first user U1 that there is a request for a range of the second user U2. The controller 120 may notify the computer device 10 (refer to FIG. 3) of the request for the range of the second user U2. The computer device 10 may display, to the first user U1, that there is a request for the range of the second user U2.

In operation S420, the first user U1 may allocate (or the computer device 10 may automatically allocate) the third range R3 to the second user U2. An algorithm for allocating a range may be variously implemented, and is not limited to any particular algorithm. Information indicating that the third range R3 is selected may be provided to the controller 120 through the computer device 10.

In operation S430, the interface block 121 may read, from the first slot S1, the first public key PK1, the first secret key SK1_PW encrypted with the first password PW1, and the third data encryption key DEK3_EPW encrypted with the first password PW1 corresponding to the third range R3 allocated to the second user U2. Also, the interface block 121 may read the second public key PK2 from the second slot S2.

In operation S440, the first secret key SK1_EPW encrypted with the first password PW1 may be provided to the encryption and decryption block 123. The encryption and decryption block 123 may restore the first secret key SK1 by decrypting the first secret key SK1_EPW encrypted with the first password PW1.

In operation S450, the second public key PK2 and the first secret key SK1 may be provided to the DH block 122. The DH block 122 may generate the common key CK12 from the second public key PK2 and the first secret key SK1 based on the DH algorithm. The common key CK12 may be provided to the encryption and decryption block 123.

In operation S460, the third data encryption key DEK3_EPW encrypted with the first password PW1 may be provided to the encryption and decryption block 123. The encryption and decryption block 123 may restore the third data encryption key DEK3 by performing decrypting by using the first password PW1. The encryption and decryption block 123 may encrypt the third data encryption key DEK3 by using the common key CK12. A third data encryption key DEK3_ECK encrypted with the common key CK12 may be provided to the interface block 121.

In operation S470, the interface block 121 may store the first public key PK1 and the third data encryption key DEK3_ECK encrypted with the common key CK12 in the second slot S2 of the meta area 111. Since the third data encryption key DEK3_ECK encrypted with the common key CK12 is stored in the second slot S2, authority for the third data encryption key DEK3 may be given to the second user U2.

For example, when the first user U1 changes the first password PW1, both the first public key PK1 and the first secret key SK1 may be changed. Accordingly, by storing the first public key PK1 in the second slot S2 together with the common key CK12, the second user U2 may use the first public key PK1 at a time when the common key CK12 is generated, even though the first password PW1 is changed.

As described with reference to FIGS. 8 and 9, the first public key PK1 and the second public key PK2 are the only data exchanged in an unencrypted state from among data exchanged between the controller 120 and the nonvolatile memory device 110. The third data encryption key DEK3 is exchanged in an encrypted state, and thus, the security of the storage device 100 is improved.

Figure 10:
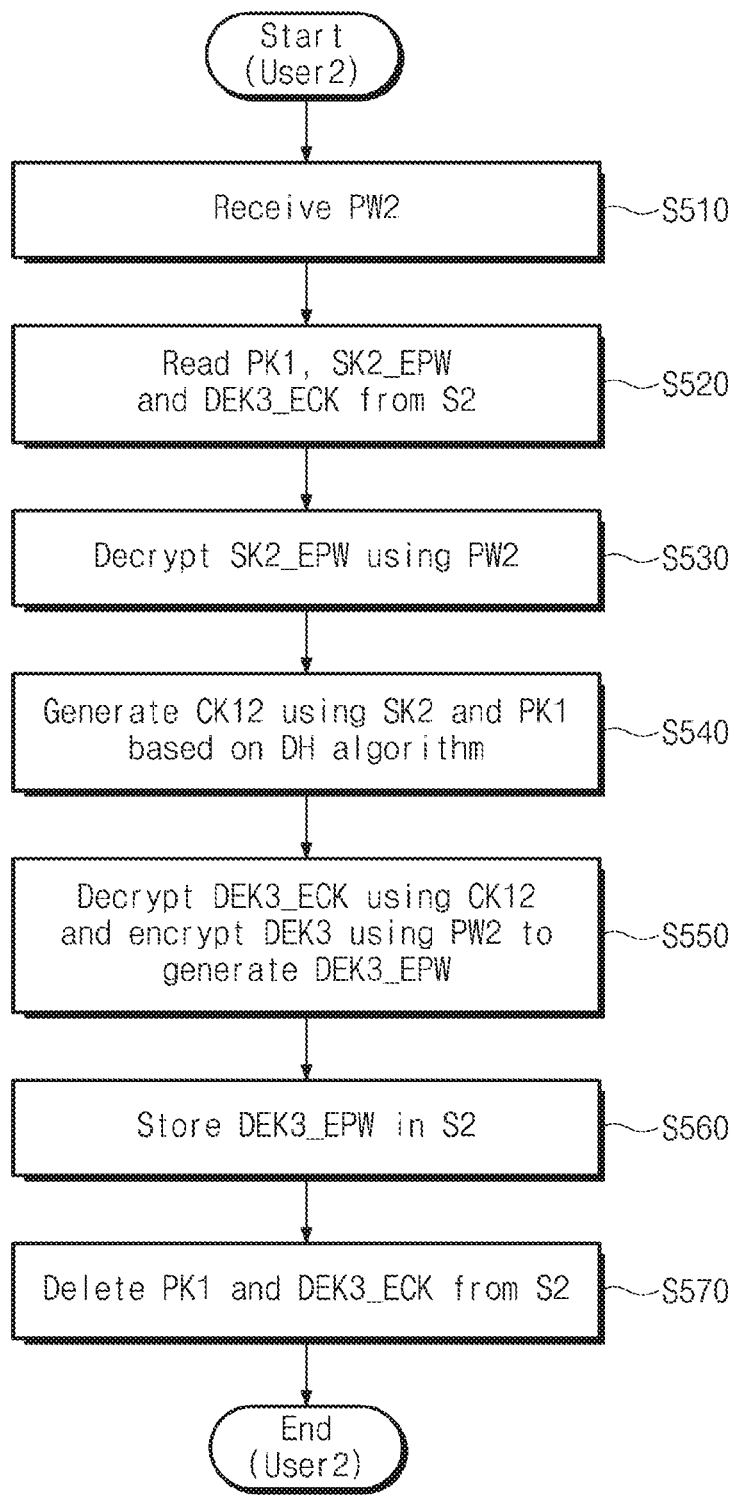
FIG. 10 illustrates a process in which a second user being unauthorized obtains a third data encryption key after authority to access is given to the second user.
Figure 11:
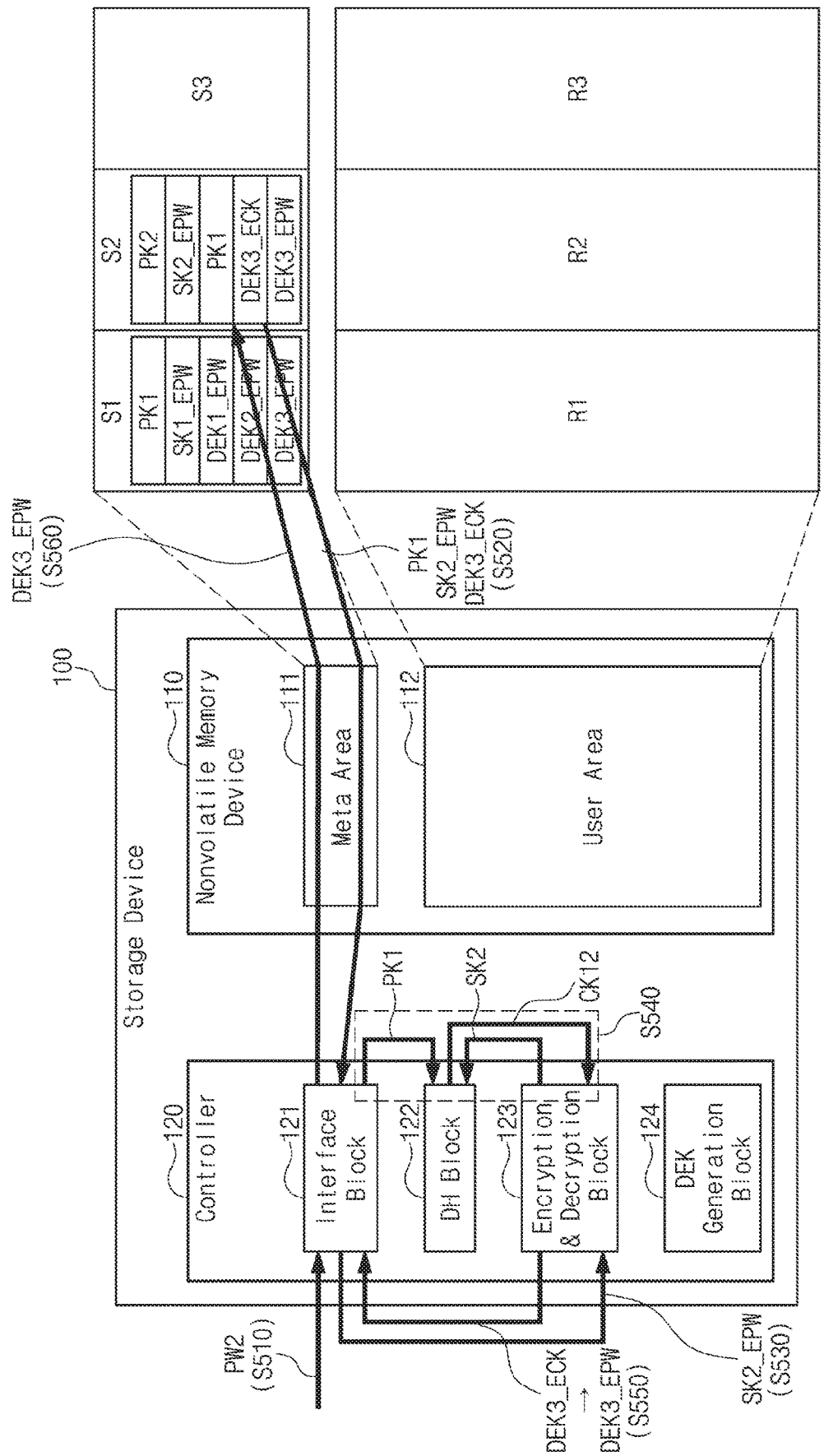
FIG. 11 illustrates an example in which information is generated and exchanged in a storage device in a process of FIG. 10.

FIG. 10 illustrates a process in which the second user U2 being unauthorized obtains the third data encryption key DEK3 after authority to access is given to the second user U2. FIG. 11 illustrates an example in which information is generated and exchanged in the storage device 100 in the process of FIG. 10. The procedures of FIGS. 10 and 11 may be performed when the second user U2 unlocks the storage device 100.

Referring to FIGS. 3, 10, and 11, in operation S510, the interface block 121 of the controller 120 may receive the second password PW2 of the second user U2.

In operation S520, the interface block 121 may read, from the second slot S2 of the meta area 111, the first public key PK1, the second secret key SK2_EPW encrypted with the second password PW2, and the third data encryption key DEK3_ECK encrypted with the common key CK12.

In operation S530, the second secret key SK2_EPW encrypted with the second password PW2 may be provided to the encryption and decryption block 123. The encryption and decryption block 123 may restore the second secret key SK2 by decrypting the second secret key SK2_EPW by using the second password PW2.

In operation S540, the first public key PK1 and the second secret key SK2 may be provided to the DH block 122. The DH block 122 may generate the common key CK12 from the first public key PK1 and the second secret key SK2 based on the DH algorithm. The common key CK12 that is generated in operation S540 depending on the DH algorithm may be the same as the common key CK12 that is generated in operation S450. The common key CK12 may be provided to the encryption and decryption block 123.

In operation S550, the third data encryption key DEK3_ECK encrypted with the common key CK12 may be provided to the encryption and decryption block 123. The encryption and decryption block 123 may restore the third data encryption key DEK3 by decrypting the third data encryption key DEK3_ECK by using the common key CK12. By obtaining the third data encryption key DEK3, authority to access the third range R3 may be given to the second user U2.

Once authority to access the third range R3 is given, the controller 120 may output a message providing a notification that authority to access the third range R3 has been given. The second user U2 may recognize that authority to access the third range R3 has been given and may access the third region R3.

The encryption and decryption block 123 may encrypt the third data encryption key DEK3 by using the second password PW2, and may generate the third data encryption key DEK3_EPW encrypted with the second password PW2. The third data encryption key DEK3_EPW encrypted with the second password PW2 may be provided to the interface block 121.

In operation S560, the interface block 121 may store the third data encryption key DEK3_EPW encrypted with the second password PW2 in the second slot S2. When the second user U2 maintains an unlock state of the storage device 100 with his/her own authority, the controller 120 may access the third range R3 by using the third data encryption key DEK3.

For example, when the storage device 100 is locked as the second user U2 terminates his/her own authority for the storage device 100, the third data encryption key DEK3 may be discarded. Since the third data encryption key DEK3_EPW encrypted with the second password PW2 are stored in the second slot S2, the authority of the second user U2 may be held.

Subsequently, when the second user U2 again unlocks the storage device 100 according to his/her own authority (e.g., with his/her own credentials (e.g., password)), the controller 120 may obtain the third data encryption key DEK3 by reading the third data encryption key DEK3 encrypted with the second password PW2 from the second slot S2 and decrypting the read result.

In operation S570, the interface block 121 may delete the first public key PK1 and the third data encryption key DEK3_ECK encrypted with the common key CK12 from the second slot S2 of the meta area 111.

As described with reference to FIGS. 10 and 11, the first public key PK1 is the only data exchanged in an unencrypted state from among data exchanged between the controller 120 and the nonvolatile memory device 110. Both the second secret key SK2 and the third data encryption key DEK3 are exchanged in an encrypted state, and thus, the security of the storage device 100 is improved.

The storage device 100 may permit an alternating connection or a simultaneous connection with the first to third users U1 to U3. When the alternating connection is permitted, only one user at a time may access the storage device 100. After the first user U1 performs the process described with reference to FIGS. 4 and 5, the first user U1 may terminate his/her own authority and may lock the storage device 100. Subsequently, the second user U2 may connect to the storage device 100 and may perform the process described with reference to FIGS. 6 and 7.

After the authority of the second user U2 is terminated, the first user U1 may unlock the storage device 100 and may perform the process described with reference to FIGS. 8 and 9. Next, after the authority of the first user U1 is terminated, the second user U2 may unlock the storage device 100 and may perform the process described with reference to FIGS. 10 and 11.

As another example, after the first user U1 performs the process described with reference to FIGS. 4 and 5, the process described with reference to FIGS. 6 and 7 may be performed in a state in which the first user U1 may unlock the storage device 100. Subsequently, in a state in which the first user U1 unlocks the storage device 100, the process described with reference to FIGS. 8 and 9 may be performed.

That is, authorizing the second user U2 may be performed primarily by the first user U1 in a state in which the first user U1 unlocks the storage device 100. In this case, the process of receiving the first password PW1 may be omitted in FIGS. 8 and 9.

When the simultaneous connection is permitted, the first and second users U1 and U2 may access the storage device 100 at the same time. After the first user U1 performs the process described with reference to FIGS. 4 and 5, even though the authority of the first user U1 is not terminated, the second user U2 may connect to the storage device 100 according to his/her own authority, and thus, the process described with reference to FIGS. 6 and 7 may be performed.

When the process described with reference to FIGS. 6 and 7 is performed in a state in which the first user U1 unlocks the storage device 100, a message providing a notification that a request for a range of the second user U2 is issued may be transferred to the first user U1 in real time. The first user U1 may perform the process described with reference to FIGS. 8 and 9 while maintaining an unlock state. In this case, operation S410 in which the first password PW1 is received may be omitted.

When the process of FIGS. 8 and 9 is performed in a state in which the second user U2 unlocks the storage device 100, the process described with reference to FIGS. 10 and 11 may be performed following the process of FIGS. 8 and 9. In this case, operation S510 in which the second password PW2 is received may be omitted.

In the exemplary embodiments described above, a password and a common key are used for encryption and decryption. However, in exemplary embodiments, a password and a common key may first be processed, and may then be used for encryption and decryption. For example, a random number may be added to a password or a common key, and a sequential hash function (e.g., PBKDF (Password-Based Key Derivation Function)) may be applied to the password or the common key to which the random number is added. A result value of the sequential hash function may be used for encryption or decryption.

In the exemplary embodiments described above, a data encryption key is encrypted and decrypted by using a password of a user. However, in exemplary embodiments, at least one different key, for example, a key encryption key, may be used between a password and a data encryption key.

For example, a data encryption key may be used to uniquely encrypt and decrypt data of a relevant range of the storage device 100. A data encryption key of each range of the storage device 100 may be encrypted through a unique key encryption key. The key encryption key of each range may be encrypted by using a password of a user having the authority to access a relevant range, and may be stored in a slot of the user having the authority to access the relevant range.

That is, the user may obtain authority to access the key encryption key by providing a password to the storage device 100, and may obtain authority to access a data encryption key by using the key encryption key.

For example, when two key encryption keys are used, a data encryption key may be encrypted and decrypted by using a first key encryption key. The first key encryption key may be encrypted and decrypted by using a second key encryption key. The second key encryption key may be encrypted and decrypted by using a password. The key encryption key may be stored in a slot of the user having the authority in an encrypted state (e.g., by using another key encryption key or another password).

In the exemplary embodiments described above, the first user U1, who is an administrator, sets the number of users in advance. However, in exemplary embodiments, the first user U1 does not set the number of users in advance. For example, in the process described with reference to FIGS. 4 and 5, the first slot S1 for the first user U1 may be generated in the meta area 111.

For example, in the process described with reference to FIGS. 6 and 7, the second slot S2 for the second user U2 may be generated in the meta area 111. That is, when a user of the storage device 100 is added, a slot for the added user may be generated. The first user U1, who is an administrator, may set the maximum number of users.

Figure 12:
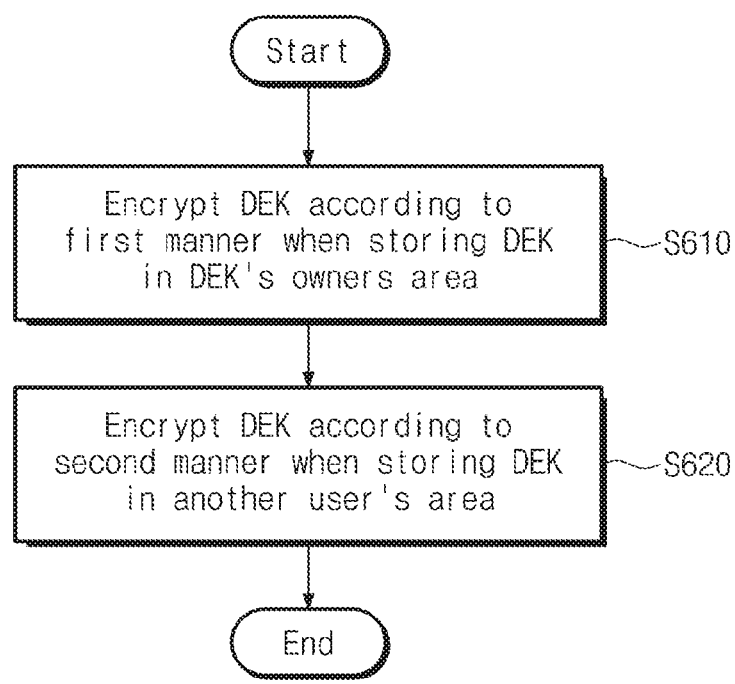
FIG. 12 illustrates an example of methods in which a storage device encrypts a data encryption key.

FIG. 12 illustrate an example of methods in which the storage device 100 encrypts a data encryption key DEK.

Referring to FIGS. 3 and 12, in operation S610, when the data encryption key DEK is stored in an area of an owner of the data encryption key DEK, that is, is stored in a slot, the encryption and decryption block 123 of the controller 120 in the storage device 100 may encrypt the data encryption key DEK in a first manner. The first manner may include, for example, encryption using a password of a user.

In operation S620, when the data encryption key DEK is stored in an area (e.g., a slot) of another user who is not an owner of the data encryption key DEK, the encryption and decryption block 123 of the controller 120 in the storage device 100 may encrypt the data encryption key DEK in a second manner different from the first manner. The second manner may include, for example, encryption based on the DH algorithm.

The DH block 122 may generate a common key by using a secret key of a user, which unlocks the storage device 100 by performing authentication of the storage device 100, and a public key of another user. The encryption and decryption block 123 may encrypt the data encryption key DEK by using the common key.

When another user to which a data encryption key encrypted based on the DH algorithm is provided unlocks the storage device 100, the DH block 122 may again generate the common key by using a secret key of another user and a public key of a user that provides the data encryption key DEK encrypted with the common key. The encryption and decryption block 123 may decrypt the data encryption key DEK encrypted in the second manner by using the common key.

As described above, the storage device 100 according to an exemplary embodiment of the inventive concept may provide an encryption and decryption technique specialized for each user, in storing the data encryption key DEK. Also, the storage device 100 according to an exemplary embodiment of the inventive concept may provide an encryption and decryption technique specialized for key exchange, in exchanging the data encryption key DEK. Accordingly, the storage device 100, which makes it efficient to store and exchange a data encryption key while improving security without leaking out the data encryption key, and an operating method of the storage device 100, are provided.

In the exemplary embodiments described above, components are described by using blocks. The blocks may be implemented with various hardware devices such as, for example, an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits enrolled as circuits or intellectual property (IP) blocks implemented with semiconductor elements in an integrated circuit.

According to exemplary embodiments of the inventive concept, a storage device supports sharing an encryption key between users in an encrypted state. A key that is encrypted for sharing is encrypted such that decryption is made in common by the users. Accordingly, a storage device, which supports sharing an encryption key while maintaining the security of the encryption key, and an operating method of the storage device, are provided.

While the inventive concept has been described with reference to the exemplary embodiments thereof, it will be apparent to those of ordinary skill in the art that various changes and modifications may be made thereto without departing from the spirit and scope of the inventive concept as set forth in the following claims.

What is claimed is:

1. A storage device, comprising:
   a nonvolatile memory device; and
   a controller configured to manage a data encryption key (DEK),
   wherein the DEK is used to encrypt data to be written in a storage space of the nonvolatile memory device by a first user and to decrypt data read from the storage space,
   wherein the controller is further configured to:
      grant a second user authority to access the storage space by encrypting the DEK based on a Diffie-Hellman (DH) algorithm;
      grant the second user authority to access the encrypted DEK;
      decrypt the encrypted DEK based on the DH algorithm;
      receive a first password from the first user;
      generate a first public key and a first secret key based on the DH algorithm;
      perform the encryption of the DEK by using the first password;
      encrypt the first secret key by using the first password;
      store the first secret key encrypted with the first password, the DEK encrypted with the first password, and the first public key in a first slot allocated to the first user from among a plurality of slots included in a meta area of the nonvolatile memory device;
      receive a first value indicating a number of ranges;
      divide a user area into a plurality of ranges based on the received first value;
      receive a second value indicating a number of users;
      divide the meta area into the plurality of slots based on the received second value; and
      allocate the slots to the users, respectively.

2. The storage device of claim 1, wherein the controller is further configured to divide the nonvolatile memory device into the user area comprising the storage space and the meta area, and
   wherein the controller stores the encrypted DEK in the meta area.

3. The storage device of claim 2, wherein granting the second user authority to access the encrypted DEK comprises storing, by the controller, the encrypted DEK in a slot allocated to the second user from among the slots.

4. The storage device of claim 2, wherein the controller is further configured to:
receive a password from the second user;
encrypt the decrypted DEK by using the password; and
store the DEK encrypted with the password in a slot allocated to the second user from among the slots.

5. The storage device of claim 2, wherein the storage space is one range of the plurality of ranges,
wherein, in response to a request of the second user, the controller encrypts the data to be written in the storage space by using the decrypted DEK and decrypts the data read from the storage space by using the decrypted DEK.

6. The storage device of claim 1, wherein the controller is further configured to:
receive a second password from the second user;
generate a second public key and a second secret key based on the DH algorithm;
encrypt the second secret key by using the second password; and
store the second secret key encrypted with the second password and the second public key in a second slot allocated to the second user from among the plurality of slots.

7. The storage device of claim 6, wherein the controller is further configured to:
read the DEK encrypted with the first password, the first secret key encrypted with the first password, and the first public key from the first slot as the second public key and the second secret key encrypted with the second password are identified from the second slot; and
decrypt the DEK encrypted with the first password and the first secret key encrypted with the first password, by using the first password,
wherein the encrypting of the DEK based on the DH algorithm comprises generating, by the controller, a common key by using the first public key and the first secret key encrypted with the first password.

8. The storage device of claim 7, wherein granting the second user authority to access the encrypted DEK to the second user includes, by the controller, storing the DEK decrypted with the first password by using the common key and storing the first public key and the DEK encrypted with the common key in the second slot.

9. The storage device of claim 8, wherein granting the second user authority to access the storage space by decrypting the encrypted DEK comprises:
receiving, by the controller, the second password from the second user;
reading the first public key, the DEK encrypted with the common key, and the second secret key encrypted with the second password from the second slot;
decrypting the second secret key encrypted with the second password by using the second password;
generating the common key by using the first public key and the second secret key decrypted with the second password; and
decrypting the DEK encrypted with the common key by using the common key.

10. The storage device of claim 9, wherein the controller is further configured to:
encrypt the DEK decrypted with the common key by using the second password; and
store the DEK encrypted with the second password in the second slot.

11. The storage device of claim 1, wherein the controller is further configured to:
prohibit the second user from accessing the storage space until the encrypted DEK is decrypted and authority to access the storage space has been granted to the second user.

12. A storage device, comprising:
a nonvolatile memory device; and
a controller configured to manage a data encryption key (DEK),
wherein the DEK is used to encrypt first data to be written in a first portion of a storage space of the nonvolatile memory device by a first user and to decrypt the first data read from the first portion of the storage space,
wherein the controller is further configured to:
encrypt the DEK in a first manner when the DEK is stored in an area of the nonvolatile memory device associated with the first user; and
encrypt the DEK in a second manner, different from the first manner, when the DEK is stored in an area of the nonvolatile memory device associated with a second user,
wherein the DEK encrypted in the second manner is used, after decryption, to encrypt second data to be written in a second portion of the storage space of the nonvolatile memory device by a second user and to decrypt the second data read from the second portion of the storage space,
wherein encrypting the DEK in the first manner comprises encrypting the DEK by using a password provided from the first user,
wherein encrypting the DEK in the second manner comprises encrypting the DEK based on a Diffie-Hellman (DH) algorithm,
wherein encrypting the DEK comprises:
generating a first public key and a first secret key of the first user based on the DH algorithm;
encrypting the DEK and the first secret key in the first manner;
storing the DEK encrypted in the first manner, the first secret key encrypted in the first manner, and the first public key in a first slot of a plurality of slots;
generating a second public key and a second secret key of the second user based on the DH algorithm;
encrypting the second secret key in the first manner; and
storing the second secret key encrypted in the first manner and the second public key in a second slot of the plurality of slots.

13. The storage device of claim 12, wherein, access to the storage space is permitted for the second user when the DEK encrypted in the second manner is stored in the area associated with the second user.

14. An operating method of a storage device comprising a plurality of ranges configured to store data and a plurality of slots respectively corresponding to the ranges, the method comprising:
when a first user accesses the storage device, encrypting a plurality of data encryption keys (DEKs) respectively corresponding to the ranges in a first manner and storing the DEKs encrypted in the first manner in a first slot of the plurality of slots;

when a second user accesses the storage device, allocating a second slot of the plurality of slots to the second user; and encrypting a DEK corresponding to one range of the plurality of ranges from among the plurality of DEKs in a second manner, different from the first manner, and storing the DEK encrypted in the second manner in the second slot, wherein encrypting the DEKs comprises:

generating a first public key and a first secret key of the first user based on a Diffie-Hellman (DH) algorithm;

encrypting the DEKs and the first secret key in the first manner; and storing the DEKs encrypted in the first manner, the first secret key encrypted in the first manner, and the first public key in the first slot, wherein allocating the second slot when the second user accesses the storage device comprises:

generating a second public key and a second secret key of the second user based on the DH algorithm;

encrypting the second secret key in the first manner; and storing the second secret key encrypted in the first manner and the second public key in the second slot.

15. The storage device of claim 14, wherein encrypting the DEK corresponding to the one range comprises:

reading the DEK encrypted in the first manner, the first secret key encrypted in the first manner, and the first public key from the first slot, when the first user accesses the storage device;

decrypting, in the first manner, the DEK corresponding to the one range from among the plurality of DEKs encrypted in the first manner and the first secret key encrypted in the first manner;

generating a common key based on the DH algorithm, by using the first secret key decrypted in the first manner and the first public key;

encrypting, in the second manner, the DEK decrypted in the first manner by using the common key; and storing the DEK encrypted in the second manner and the first public key in the second slot.

* * * * *